US011769481B2

(12) United States Patent
Shih et al.

(10) Patent No.: US 11,769,481 B2
(45) Date of Patent: Sep. 26, 2023

(54) UNSUPERVISED ALIGNMENT FOR TEXT TO SPEECH SYNTHESIS USING NEURAL NETWORKS

(71) Applicant: Nvidia Corporation, Santa Clara, CA (US)

(72) Inventors: Kevin Shih, Santa Clara, CA (US); Jose Rafael Valle Gomes da Costa, Berkeley, CA (US); Rohan Badlani, San Jose, CA (US); Adrian Lancucki, Legnica (PL); Wei Ping, Sunnyvale, CA (US); Bryan Catanzaro, Los Altos Hills, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 17/496,569

(22) Filed: Oct. 7, 2021

(65) Prior Publication Data
US 2023/0113950 A1   Apr. 13, 2023

(51) Int. Cl.
| | |
|---|---|
| G10L 13/00 | (2006.01) |
| G10L 13/10 | (2013.01) |
| G10L 13/06 | (2013.01) |
| G10L 13/07 | (2013.01) |
| G10L 13/047 | (2013.01) |
| G10L 25/90 | (2013.01) |
| G06N 3/045 | (2023.01) |
| G06N 3/08 | (2023.01) |
| G10L 13/033 | (2013.01) |
| G10L 13/08 | (2013.01) |

(52) U.S. Cl.
CPC ............ *G10L 13/047* (2013.01); *G06N 3/045* (2023.01); *G06N 3/08* (2013.01); *G10L 13/0335* (2013.01); *G10L 13/08* (2013.01); *G10L 25/90* (2013.01)

(58) Field of Classification Search
CPC ......... G10L 13/10; G10L 13/08; G10L 13/00; G10L 13/06; G10L 13/07
See application file for complete search history.

(56) References Cited

U.S. PATENT DOCUMENTS

| 10,186,252 B1 * | 1/2019 | Mohammadi ........... G10L 13/10 |
| 2006/0259303 A1 * | 11/2006 | Bakis ...................... G10L 13/10 |
| | | 704/268 |
| 2013/0124984 A1 * | 5/2013 | Kuspa ................ H04N 21/8547 |
| | | 715/255 |

FOREIGN PATENT DOCUMENTS

| CN | 109256152 A | | 1/2019 |
| CN | 111739508 A | * | 10/2020 |
| CN | 113870830 A | * | 12/2021 |
| CN | 113903326 A | * | 1/2022 |
| GB | 2603776 A | | 8/2022 |

(Continued)

OTHER PUBLICATIONS

Non-Final Office Action issued in U.S. Appl. No. 17/496,636, dated Oct. 27, 2022.

*Primary Examiner* — Shreyans A Patel
(74) *Attorney, Agent, or Firm* — Hogan Lovells US LLP

(57) ABSTRACT

Generation of synthetic speech from an input text sequence may be difficult when durations of individual phonemes forming the input text sequence are unknown. A predominantly parallel process may model speech rhythm as a separate generative distribution such that phoneme duration may be sampled at inference. Additional information such as pitch or energy may also be sampled to provide improved diversity for synthetic speech generation.

18 Claims, 15 Drawing Sheets

(56) References Cited

FOREIGN PATENT DOCUMENTS

| JP | 3727885 B2 | * | 12/2005 | | |
|----|------------|---|---------|---|---|
| JP | 3756864 B2 | * | 3/2006 | | |
| WO | WO-9530193 A1 | * | 11/1995 | ............. | G10L 13/08 |
| WO | 2022121176 A1 | | 6/2022 | | |
| WO | 2022203699 A1 | | 9/2022 | | |

* cited by examiner

UNSUPERVISED ALIGNMENT FOR TEXT TO SPEECH SYNTHESIS USING NEURAL NETWORKS

BACKGROUND

Speech synthesis is generally modeled in an autoregressive manner, where a statistical model is used to generate output speech based on an input text sequence. These models predict different phoneme lengths for the input text sequences, but a single poorly predicted audio frame may lead to additional errors throughout the entire sequence of synthesized speech. Autoregressive models also scale poorly, especially as sequence lengths increase. Moreover, attempts to integrate autoregressive models into parallel architectures have developed their own problems, such as trouble with audio-text alignment. Furthermore, autoregressive models may lack diversity in synthetic speech outcome, where an input text sequence leads to a similar output each time a model is executed, which may be undesirable in many applications.

BRIEF DESCRIPTION OF THE DRAWINGS

Various embodiments in accordance with the present disclosure will be described with reference to the drawings, in which.

DETAILED DESCRIPTION

Figure 1:
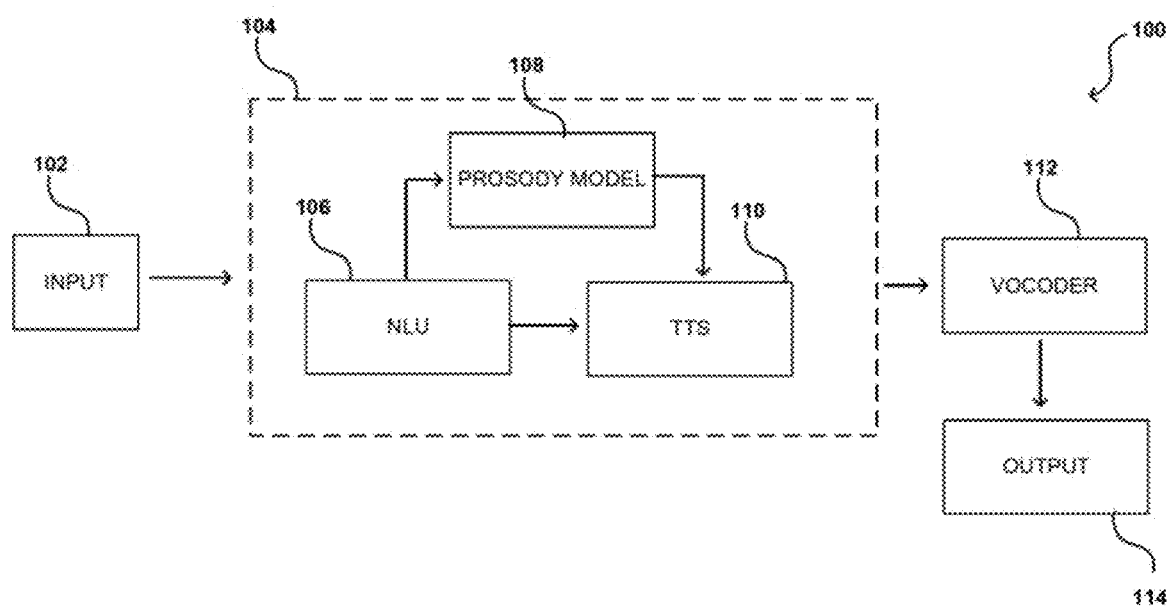
FIG. 1 illustrates an example of a pipeline for speech synthesis, according to at least one embodiment.

Approaches in accordance with various embodiments provide systems and methods for end-to-end text-to-speech (TTS) models. In at least one embodiment, TTS models are parallel or at least partially parallel. Various embodiments may include models that further model speech rhythm as a sampleable distribution to facilitate variable token duration during inference. In at least one embodiment, systems and methods provide online extraction of speech-text alignment.

Various embodiments relate to systems and methods for TTS generation using a predominantly parallel end-to-end model. Embodiments include unsupervised alignment using a probabilistic determination in order to align individual phonemes, that may have variable lengths, with corresponding text. A generative model is used to sample over a distribution of plausible phoneme durations, where a boundary may be set to eliminate consideration of durations that are unlikely or unrealistic. Additionally, another generative model may be developed for pitch and energy of different phonemes, which may be extracted during the training phase. Diversity may be achieved by sampling diverse locations from the same probabilistic distribution. Systems and methods may also be directed toward improvements in training using distribution aware data augmentation where synthesized data may be tagged/categorized during training and then may be ignored or otherwise not used at inference time.

Various embodiments of the present disclosure are directed toward overcoming problems associated with traditional alignment tools with TTS, where these tools attempt to extract the alignment prior to inferences or rely on attention mechanisms. Using a forced aligner may have limited capabilities, for example, where an aligner is not available for a particular language or alphabet. Additionally, attention mechanisms for aligners have proven unstable and may not converge to meaningful solutions. Systems and methods of the present disclosure may address these, and other problems, by extending attention-based mechanisms to add a prior distribution, which in one or more embodiments may be cigar-shaped. Furthermore, systems and methods may deploy various techniques related to Hidden Markov Methods (HM), such as forward-sub algorithms and viterbi, in order to identify most likely strings of text for given signals.

Embodiments may also address problems associated with insufficient or small data sets used for training. With respect to TTS synthesis training pipelines, augmented data sample are rarely incorporated because these samples may be considered as outside of a desired distribution for modeling because, in many instances, it is undesirable to synthesize text to sound similar to the augmented data samples. In at least one embodiment, systems and methods may incorporate data augmentation to improve generalization of models without having effects that bleed into the inference results. For example, augmented data may be labeled or otherwise identified within one or more generated distributions, where sampling during inference avoids those areas.

Diversity with synthesized speech is also addressed using systems and methods of the present disclosure. In at least one embodiment, the same text may be synthesized multiple times with each outcome being plausible and qualitatively different. A generative model (normalizing flow) may be utilized to sample plausible phoneme durations at inference time, which may provide improved diversity because one significant variation with respect to speech is phoneme duration. Systems and methods may also be directed toward pitch and energy modeling, thereby providing greater options for diversity with synthesized speech. In at least one embodiment, pitch and energy may be modeled and a probabilistic component may sample from these models when generating output speech.

Various embodiments may also improve speaker conditioning variables. For example, traditional multi-speaker TTS models may assign a dimensional vector for a particular speaker and then apply that vector when generating an output. However, using a single vector for speakers may limit a model's ability to generate similar or different sounding outputs without modeling individual variances for speakers. Embodiments may generate a vector as a function of an input and model across a speaker's distribution at inference time.

A text-to-speech (TTS) pipeline 100, which may also be referred to as speech synthesis, is illustrated in FIG. 1 that includes an input 102 that may correspond to a textual input. It should be appreciated that the input may be an initial text input, such as an input provided by a user, a converted text input, such as an utterance that has been evaluated and then converted to text, a sequence of text extracted from an input image or video, or the like. In at least one embodiment, the input 102 may be responsive to a question or comment provided by a user, such as a conversational artificial intelligence (AI) system that provides answers responsive to user queries, among other applications. The illustrated input 102 may be formatted for inclusion within a processing framework 104, that may include one or more trained machine learning systems to evaluate the input 102 for one or more features, which may enable conversion of the input 102 into an audio output that emulates human speech.

In this example, the processing framework 104 includes a natural language understanding (NLU) system 106, a prosody model 108, and a TTS module 110. As will be appreciated, the NLU system 106 may be utilized with one or more conversational AI systems to enable humans to interact naturally with devices. The NLU system 106 may be utilized to interpret context and intent of the input 102 to generate a response. For example, the input 102 may be preprocessed, which may include tokenization, lemmatization, stemming, and other processes. Additionally, the NLU system 106 may include one or more deep learning models, such as a BERT model, to enable features such as entity recognition, intent recognition, sentiment analysis, and others. Furthermore, the NLU system 106 may enable conversion of linguistic units of the input 102 into phonemes, which may then be assembled together using the prosody model 108.

In at least one embodiment, TTS model 110 may take a text response generated by the NLU system 106 and change it to natural-sounding speech. It should be appreciated that, in various embodiments, the prosody model 108 may be part of the TTS model 110. The output from the NLU system 106 may undergo various processes associated with the TTS model 110, such as linguistic analysis, synthesis, and the like. Additionally, parts of speech may be tagged. In various embodiments, output may be further analyzed for refining pronunciations, calculating the duration of words, deciphering the prosodic structure of utterance, and understanding grammatical information. Additionally, text may be converted to mel-spectograms for output to the vocoder 112 to generate natural sounding speech. As noted above, it should be appreciated that, in various embodiments, the vocoder 112 may be incorporated into the TTS model 110. Accordingly, an audio output 114 is generated that sounds like human speech.

Speech synthesis may be modeled sequentially in a fully autoregressive manner, where training and interference speeds are unable to or inefficiently scale as sequence length increases. Additionally, errors within one or more audio frames may be propagated to other parts of the synthesized speech. Parallelizing speech synthesis is desirable, but may suffer from problems associated with phoneme length. For example, without synthesizing the phonemes, it is difficult to know their individual lengths. Additionally, methods that may first determine phonemes in input text, and then sample from a mel-spectogram, miss out on full end-to-end parallelization of systems and methods of the present disclosure. Systems and methods of the present disclosure may be directed toward an end-to-end system that includes online alignment along with implementation of a generative model for inferring diverse results.

Existing alignment techniques are often insufficient or unusable in parallel architectures. For example, existing techniques may distill attention from an autoregressive model into a parallel architecture that incorporates a two-stage process, which may be costly to train. Moreover, these techniques are often limited, with independent training being used for individual languages or alphabets used with the system. Furthermore, these techniques often display a loss in inference diversity, such as variability with speech rhythm. Systems and methods may overcome these drawback by incorporating one or more generative models, which may be separate models, for token durations.

Figure 2A:
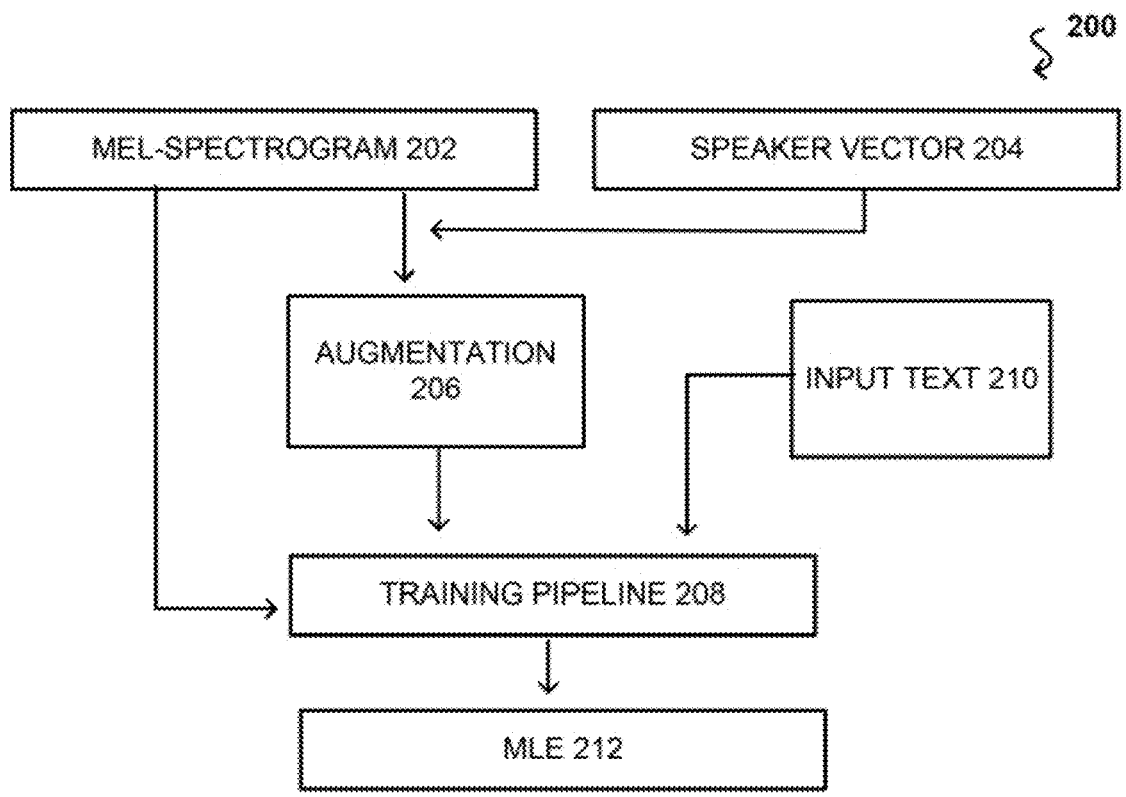
FIG. 2A illustrates an example of a training pipeline for speech synthesis, according to at least one embodiment.

A training pipeline 200, shown in FIG. 2A, may be utilized to construct a generative model for sampling mel-spectrograms given textual input and speaker information. In this example, a mel-spectrogram 202 is provided with a speaker vector 204 (0, which may encode speaker-specific characteristics, for augmentation 206. For example, the mel-spectrogram may be for an audio clip of human speech, which may be represented as a mel-spectrogram tensor $X \in \mathbb{R}^{C_{mel} \times T}$, where T is the number of mel-frames over the temporal axis, and $C_{mel}$ is the number of bands of dimensions per frame. The speaker vector 204 may include information for corresponding changes with respect to a data distribution. In this example, augmentation 206 may be applied with a certain probability, which may change the mel-spectrogram 202 with corresponding changes to the speaker vector 204, and then an output is directed toward a training pipeline 208. It should be appreciated that the mel-spectrogram 202 may also be directed toward the training pipeline 208 without augmentation along with input text 210, which may be represented as a tensor of an embedded text sequence, as shown by $\phi \in \mathbb{R}^{C_{txt} \times N}$, where N is a length. The resultant output is a maximum likelihood estimation (MLE) 212 over a latent space. This output may correspond to latent random variables for mel and durations (speech rate) that have been optimized.

Figure 2B:
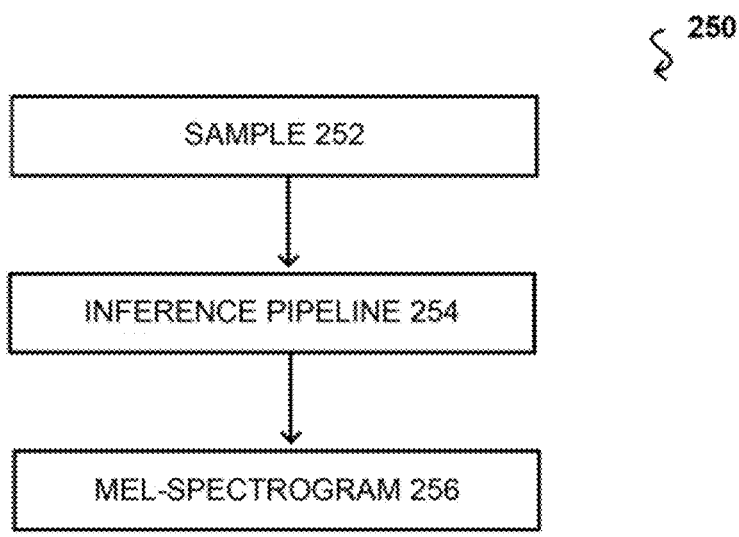
FIGS. 2B and 2C illustrate an example of an inference pipeline for speech synthesis, according to at least one embodiment.

An inference pipeline 250, shown in FIG. 2B, may sample from the MLE 212 in order to generate an input sample 252. Random sampling of the MLE 212 may enable diverse inference results. In at least one embodiment, sample 252 is processed by an inference pipeline 254 to output a second mel-spectrogram 256, which may then be processed to produce an output audio clip.

Various embodiments of the present disclosure enable sampling for both mel-spectrogram frames and their durations at inference time while maintaining a parallel architecture for modeling. In operation, a temporal alignment is developed between the audio clip (e.g., mel-spectrogram 202) and the text (e.g., input text 210). The alignment may be represented as $A \in \mathbb{R}^{N \times T}$. Accordingly, a conditional distribution may be represented by Equation (1).

$$P(X, A, F_0, E | \Phi, \xi) = P_{mel}(X | \Phi, \xi, A, F_0, E) P_{dur}(A | \Phi, \xi) P_{pitch}(F_0 | \Phi, \xi) P_{energy}(E | \Phi \xi) \quad (1)$$

As noted, in the conditional representation, X represents a mel-spectrogram tensor, A represents the alignment, $F_0$ represents pitch, and E represents energy. Accordingly, as will be described below, various embodiments may enable sampling over a variety of different distributions, which may include duration, pitch, energy, and other properties of speech not captured by duration, pitch, and energy, such as, but not limited to, intonation, stress, tempo, rhythm, and the like It should be appreciated that, in various embodiments, one or more portions of instructions (e.g., software instructions) for executing at least a portion of Equation (1) may be parallel. By way of example, $P_{mel}$ may be parallel. However, one or more other parts, or components of parts, of Equation (1) may include one or more autoregressive components, such as duration, pitch, energy, and text. Accordingly, different components of various embodiments may balance costly training steps.

In operation, normalizing flows are applied to mel-coding in TTS. Distributions may be modeled such that each time step in a distribution can be sampled from a simple distribution. In various embodiments, independent and identically distributed random variables are assumed. Accordingly, the MLE 212 with respect to data samples x may be represented by Equation (2)

$$\log p_x(x) = \log p_z(g^{-1}(x)) + \log|\det J(g^{-1}(x))|, \quad (2)$$

where $p_x(x)$ represents the unknown likelihood function for each mel-frame $P_{mel}(\ )$, $p_z(z)$ represents a Gaussian likelihood function, and J is the Jacobian of an invertible transformation g such that $z = g^{-1}(x)$.

In one or more embodiments, inference may be performed as represented by Equation (3).

$$z \sim N(O,I) \text{ and } x = g(z) \quad (3)$$

During inference, a phoneme flow may be utilized to attain per-phoneme durations, which may correspond to the alignment A, which are used to prepare the input to a parallel mel-decoder flow that models $P_{mel}(\ )$. This decoder may sample latent vectors, such as from the MLE 212, and map them to plausible-sounding mel-frames, as noted herein. Alignment between text and speech, without dependencies on external aligners, is an important process for providing an end-to-end TTS system. Various embodiments of the present disclosure may utilize one or more affine coupling layers to split input data for use to infer scale and translation parameters. In various embodiments, inputs may be conditions on context, which may be related to a temporal dimension. The affine coupling layer may be used to generate one or more context matrices. This may be used along with the speaker embedding vector in order to provide a matrix with temporal alignment between text information and mel-spectrogram frames, as well as provide speaker-dependent information. Recent work may utilize a flow-based model for mapping mel-spectrogram frames to latent vectors. While this method may yield stable results, non-invertible architectures often lead to attention collapsing to trivial solutions, which may limit transferability to other models. Moreover, as noted above, the flow-based model does not account for the loss in inference diversity. Accordingly, the systems and methods of the present disclosure continue to illustrate improvements over existing models.

Figure 2C:
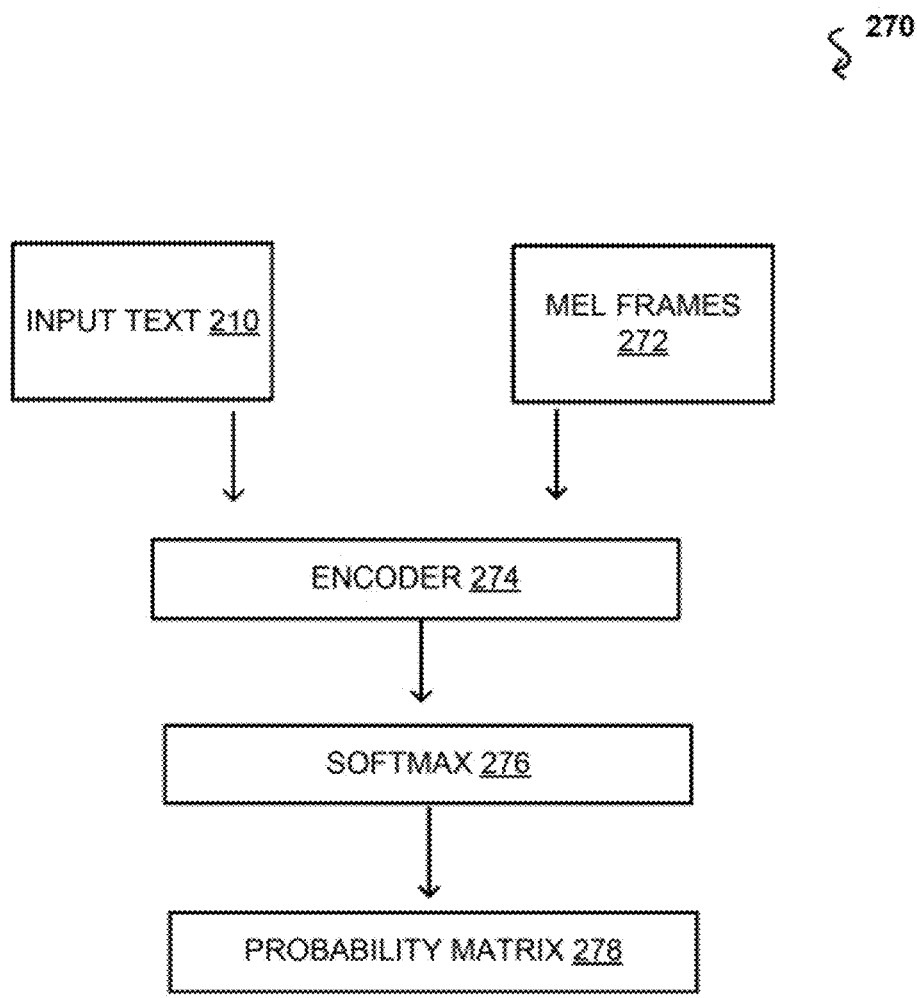

An alignment architecture 270 is illustrated in FIG. 2C, which may form one or more portions of a machine learning system that may be utilized with embodiments of the present disclosure. In this example, input text 210 and mel frames 272, which may correspond, at least in part to mel-spectrogram 202, are both encoded at an encoder 274, which may include separate encoders for the mel frames and the input text 210. For example, a text encoder may evaluate text tokens (e.g., phoneme embeddings). In at least one embodiment, each of the input 210 and frames 272 are coded with 1D convnets with a limited receptive field to incorporate local context. The encoder 274 generates an output that serves an input to a softmax function 276, which may generate probability matrix 278 that includes one or more vectors of probabilities for the text and mel frames, which may be utilized to generate one or more visualizations, as noted herein.

Various embodiments may enable unsupervised or partially unsupervised alignment learning. The alignment may be developed without any dependencies on external aligners. In at least one embodiment, a combination Viterbi and forward-backward algorithms used in Hidden Markov Models (HMMs) may be utilized in order to learn both hard and soft alignments, respectively. As noted above, alignment may be represented as $A \in \mathbb{R}^{N \times T}$, where different alignments may be designated as a "hard" alignment or a "soft" alignment. $A_{soft}$ may represent alignment between text $\Phi$ and mel frames X of lengths N and T respectively, such that every column of $A_{soft}$ is normalized to a probability distribution. $A_{soft}$ may be processed to extract monotonic, binarized alignment matrices $A_{hard}$ such that for every frame the probability mass is concentrated on a single symbol, and $$\sum_{j=1}^{T} A_{hard,i,j}$$

yields a vector of durations of every symbol.

Soft alignment may be based on a learned pairwise affinity between all text tokens $o \in \Phi$ and mel-frames $x \in X$, which may be normalized with softmax across the text dimension represented in Equations (4) and (5).

$$D_{i,j} = \text{dist}_{L2}(\phi_i^{enc}, x_j^{enc}), \quad (4)$$

$$A_{soft} = \text{softmax}(-D, \text{dim}=0) \quad (5)$$

With respect to Equations (4) and (5), $x^{enc}$ and $\phi^{enc}$ are encoded variants of x and $\phi$, each using a 2 or 3 1D convolution layer. In various embodiments, a loss module may be utilized to develop a monotonic sequence that starts and ends at the first and last text tokens respectively, uses each text token once, and enables advancement by 0 or 1 text tokens for every advance of mel frame.

Various embodiments enable acceleration of alignment learning using a prior that promotes the elements on a near-diagonal path. A beta-binomial distribution may be used to encourage forward movement of the attention mechanism. This beta-binomial distribution may be used to construct a 2D cigar-shaped prior over a diagonal of $A_{soft}$, which widens in the center of the matrix and narrows towards the corners. The prior may be weighted or scaled, where a lower weight may increase a width of the prior.

Because alignments generated through duration predication are inherently binary, the model may be conditioned on a binarized alignment matrix to avoid creating a train-test domain gap. This may be achieved using the Viterbi algorithm while applying the same constraints for a monotonic alignment, which may provide the most likely monotonic alignment from the distribution over monotonic paths. Additionally, results may be managed such that $A_{soft}$ matches $A_{hard}$ as much as possible by minimizing loss.

Figure 3:
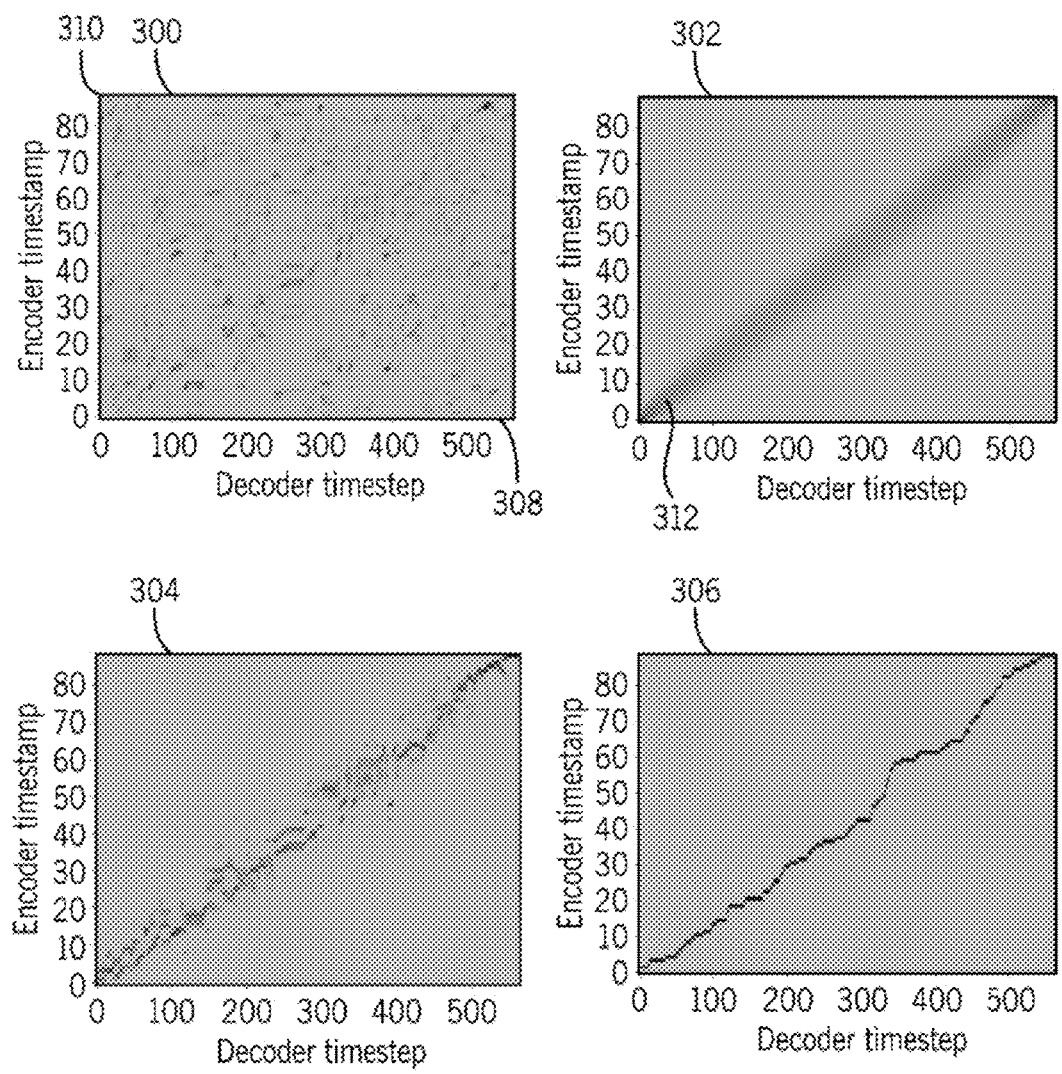
FIG. 3 illustrates examples of alignment attention matrices, according to at least one embodiment.

A soft alignment visualization 300 is shown in FIG. 3, along with a beta-binomial prior visualization 302, a soft alignment with prior visualization 304, and a hard alignment 306. In these examples, mel frames are represented on an x-axis 308 and text tokens are represented on a y-axis 310. The soft alignment 300 illustrates a variety of different potential alignments across a time period, with the most likely alignments shown as lighter shading near the corners (e.g., a bottom left corner and a top right corner), corresponding to a start and end time for the audio clip. Application of the prior 312 is shown in the visualization 302, where the prior 312 has a cigar-shape (e.g., a wider middle than edges) and extends substantially along a diagonal from the bottom left to the top right. As noted above, this configuration may enable restriction of alignment at portions likely to be aligned, such as the beginning (bottom left) and end (top right), thereby potentially improving accuracy. The prior 312 may apply a boundary to limit sampling over a most probable portion of the distribution, as shown in visualization 304, where soft alignment is improved, which may be illustrated by the lighter shading illustrated along the diagonal represented by the prior 312. The visualization 306 illustrates an even more improved alignment substantially conforming to the angle and size of the prior 312. Accordingly, synthesized speech may utilize the alignment developed using the prior in order to determine how to apply sampled phoneme durations to generate synthesized speech.

Figure 4A:
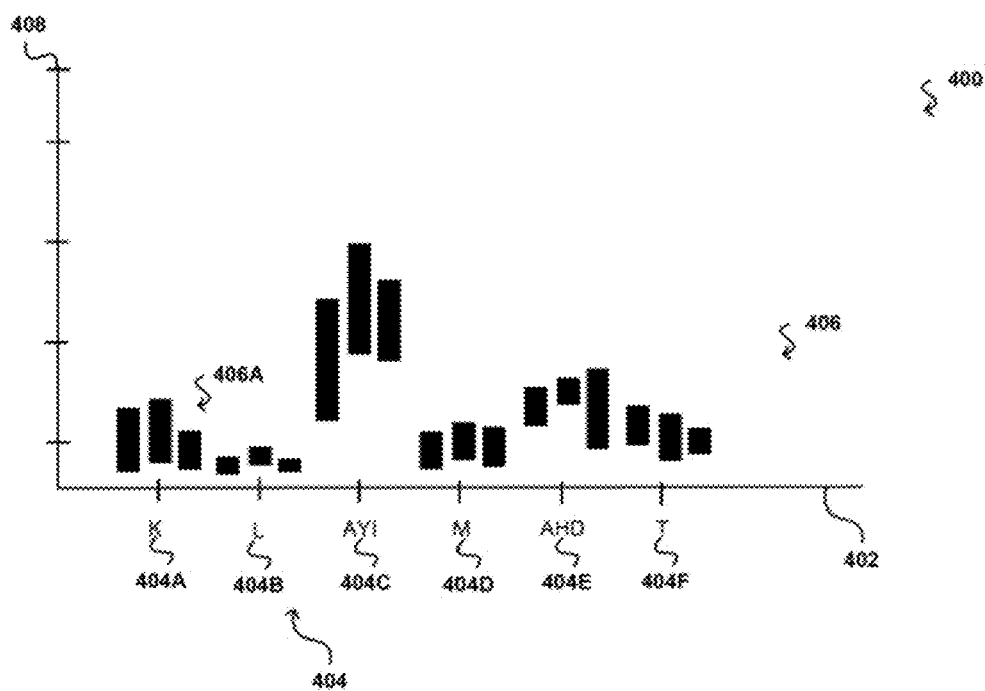
FIG. 4A illustrates an example phoneme distribution, according to at least one embodiment.

A sample phoneme-level duration distribution 400 is illustrated in FIG. 4A. In this example, phonemes forming the world "climate" are illustrated. As shown, the x-axis 402 represents the phonemes 404 forming the word "climate," which in this instance correspond to "k," "l," "ayi," "m," "and," and "t." Each of these phonemes 404A-404F include a respective set of distributions 406A-406F corresponding to a duration, represented on the y-axis 408. These distributions may be generated based upon evaluations of a set of speakers saying the word "climate" to determine how long each phoneme takes to recite. As shown, each of the phonemes 404A-404F may have a slightly different duration, and as a result, attempting to force alignment between text and speech using a fixed duration will lead to an unnatural sounding audio output. That is, the duration of "ayi" may be approximately twice as long as "k," and a fixed duration for each phoneme would lead to either a pause or delay after "k" or a clipping or rushed response of "ayi." As noted, various embodiments of the present disclosure may enable improved diversity by sampling over different distributions for various phonemes. By way of example, in this example the phoneme 404A corresponding to "k" has three different distributions 406A (e.g., a set of distributions that have slightly different durations). Accordingly, at inference, one of the distributions may be selected and, within that distribution, a duration may be selected. In another example, using a similar sound, a different distribution and duration may be selected. In this manner, improved diversity in synthesized speech is enabled by providing different phoneme durations at inference, or at least, providing a likelihood that a different duration will be selected.

Figure 4B:
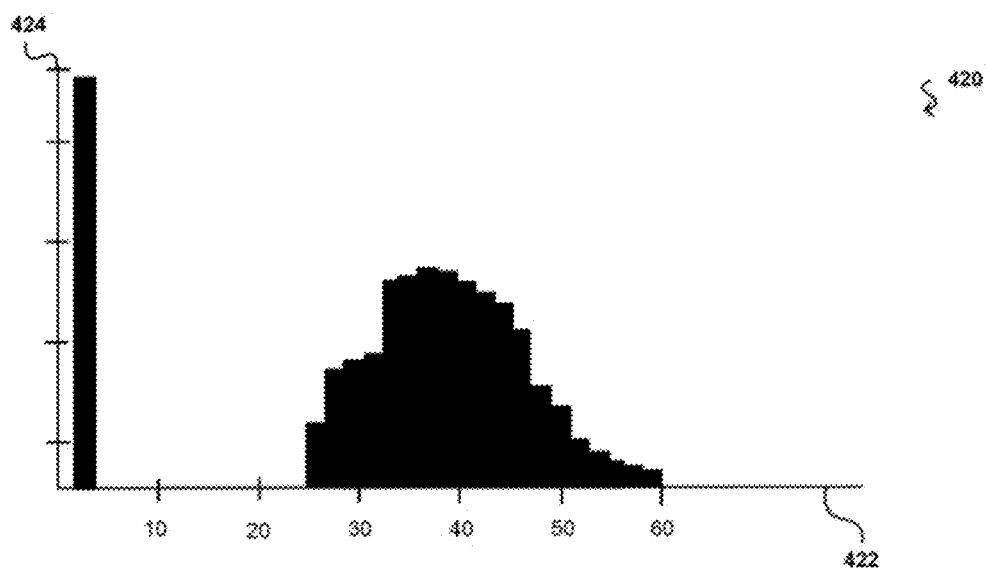
FIG. 4B illustrates an example pitch distribution, according to at least one embodiment.

A pitch distribution 420 is illustrated in FIG. 4B, which may be further utilized to provide improved diversity with respect to synthetic speech, as described herein. As shown, the x-axis 422 corresponds to time and the y-axis 424 corresponds to relative pitch. In this example, the distribution 420 may be computed by evaluating a group of sentences or words, for example during one or more training stages. During inference, pitch may also be sampled from the distribution 420 to provide further diversity in synthesized speech. That is, different attempts to synthesize the same word may lead to a diverse set of results, where a different pitch is presented. When further combined with the phoneme duration selection of FIG. 4A, the same word may be synthesized while sounding different, such as from a different speaker altogether.

Figure 5:
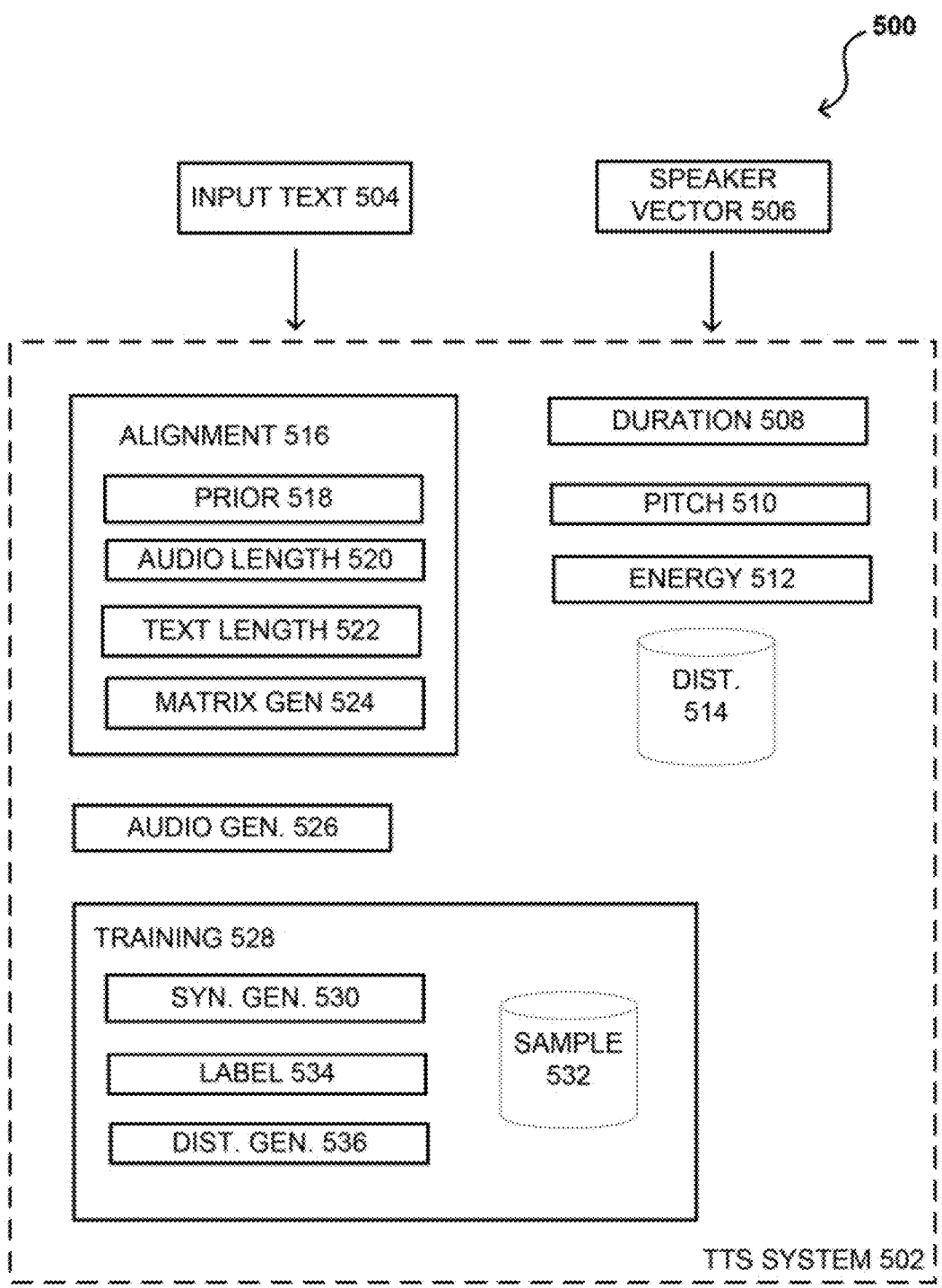
FIG. 5 illustrates an example environment for speech synthesis, according to at least one embodiment.

A synthetic speech system 500 is illustrated in FIG. 5, which may include one or more components previously described herein. It should be appreciated that components may be grouped for illustrative purposes, but that one or more systems may be integrated into or used with different components of the system 500. Furthermore, one or more systems may utilize or otherwise share architecture related to one or more machine learning systems. Accordingly, different components may be described as a separate module or system based on one or more functions, but may be part of a single integrated system. In this example, a TTS system 502 may be utilized to generate synthetic speech based, at least in part, on a text input 504 and a speaker vector 506. In at least one embodiment, the speaker vector 506 includes one or more speaker properties, such as a desired pitch, energy, tone, accent, or the like. In various embodiments, the speaker vector 506 may include weighting properties corresponding to various parts of speech that may be applied to the synthetically generated speech. Furthermore, the speaker vector 506 may be a tunable component to enable voice conversion, among other features. Furthermore, in at least one embodiment, the speaker vector 506 may be selected from a distribution or from a database of speaker vectors. Moreover, in at least one embodiment, different components of the speaker vector 506 may be sampled or otherwise obtained from a distribution.

In this example, the input text 504 and speaker vector 506 are provided as input to the TTS system 502, where the input text 504 may be evaluated to determine, at least in part, a duration. For example, a duration module 508 (e.g., duration system) may be used to sample over one or more distributions in order to determine respective durations for individual phonemes forming the input text 504. As previously discussed, training data may be utilized to generate phoneme distributions and individual phonemes forming input text 504 may be sampled from the distributions in order to determine respective lengths. In at least one embodiment, lengths may be different for each time a phoneme is evaluated, which improves diversity in the output synthesized speech. Determination of the duration may then be utilized during alignment, as discussed herein.

Further illustrated are pitch and energy modules 510, 512 that may be utilized to sample respective distributions to obtain pitch (e.g., fundamental frequency) and energy (e.g., amplitude) for different phonemes forming the input text 504. In at least one embodiment, at least a portion of pitch and energy may be determined, at least in part, by the speaker vector 506. For example, the speaker vector 506 may provide weights to influence pitch and energy. In certain embodiments, pitch and energy may be determined by speaker vector 506, such as a directed attempt for voice conversion. In various embodiments, distributions for duration, energy, and pitch may be stored in a distribution data store 514, which may be accessed at inference. As will be appreciated, distributions may vary based on language or alphabets, and moreover, may be updated using one or more training processes. While duration, pitch, and energy may be described as components that are used for sampling, it should be appreciated that various other data points and distributions may be utilized for sampling. By way of example only, various features associated with prosody may be utilized for sampling as well, such as emphasis, contrast, focus, or one or more elements not otherwise represented in grammatical choices by a speaker. Furthermore, additional factors of evaluation may include intonation, stress, tempo, rhythm, pause, and the like.

In at least one embodiment, alignment between input text and output audio may be performed via one or more alignment modules 516, which may include various machine learning systems that enable, in part, recursive computations over a set of probabilities in order to determine a most likely or highest probability alignment between different phonemes forming the input text 504. The alignment likelihood between a phoneme (from the text) and a mel sample (from the audio training data) is based on the L2 distance, which can be interpreted as proportional to Gaussian likelihood, as noted herein. In this example, an audio length module 520 may determine audio length based, at least in part, on the input text 504 and/or the duration of phonemes forming the input text. Moreover, a text length module 522 may determine a text length, which may then be correlated to the audio length and presented as a matrix, which may be formed by the matrix generation module 524. In at least one embodiment, the matrix generation module 524 may be utilized to generate a matrix of potential phoneme durations with respect to their position and then the prior module 518 may apply the prior to the matrix in order to bound or otherwise restrict evaluation to a most likely position. By way of example, a cigar-shaped prior may be constructed from a beta-binomial distribution, as shown in Equation (6)

$$P(mel, text, alignment) = P(mel, text_n | alignment) P(alignment), \qquad (6)$$

where P(alignment) is a betabinomial cigar shaped prior and P(mel, text|alignment) is the L2 distance between the mel sample at time step t and the nth text phoneme in the sequence. As noted herein, the prior may include boundaries and be positioned at a diagonal stretching from a bottom left corner to a top right corner. It should be appreciated that the prior may be tunable such that different boundaries may be utilized. Accordingly, alignment between the input text 504 and an audio duration may be generated.

In at least one embodiment, an audio generation module 526 may generate output audio based, at least in part, on the alignment and the input text 504, among other features such as the speaker vector 506 and/or the pitch, energy, and the like. In various embodiments, audio generation may have improved diversity due to the sampling from various distributions at inference, which may change or modify different phoneme durations, which may lead to different alignments, and therefore, different output speech. Furthermore, changes in sampling to the pitch or energy may further improve on the output diversity.

Various embodiments may also include one or more training systems 528 that may enable generation of synthetic training data for use in improving the TTS system 502. In various embodiments, the training system 528 may enable distribution aware augmentation where synthetic training information may be generated, used in training, and then removed at inference. By way of example, a synthetic speech generation 530 may obtain samples from a sample data store 532 and modify one or more properties of the speech, such as changing a pitch or an energy, or modifying various phoneme lengths, among other possibilities. This synthetic speech may be labeled or otherwise identified using a label module 534, which may attach information, such as metadata, to the synthetic speech for identification at a later time. This identification may be applied to all synthetic speech, where synthetic speech may be considered "dirty" or otherwise "unclean" when compared to actual ground truth training data. In other embodiments, one or more properties may be evaluated to determine whether data is considered clean or dirty, such as identification of one or more features for comparison against a threshold. A distribution generator 536 may then modify or generate one or more distributions using information from the synthetic speech. These generated distributions may then be used for training purposes, but during inference, synthetic speech may be identified, such as using the labels, and then removed. In this manner, additional training data may be generated to improve the model, but at inference, only data forming the ground truth information is used for generation of synthetic speech responsive to the user input.

Figure 6A:
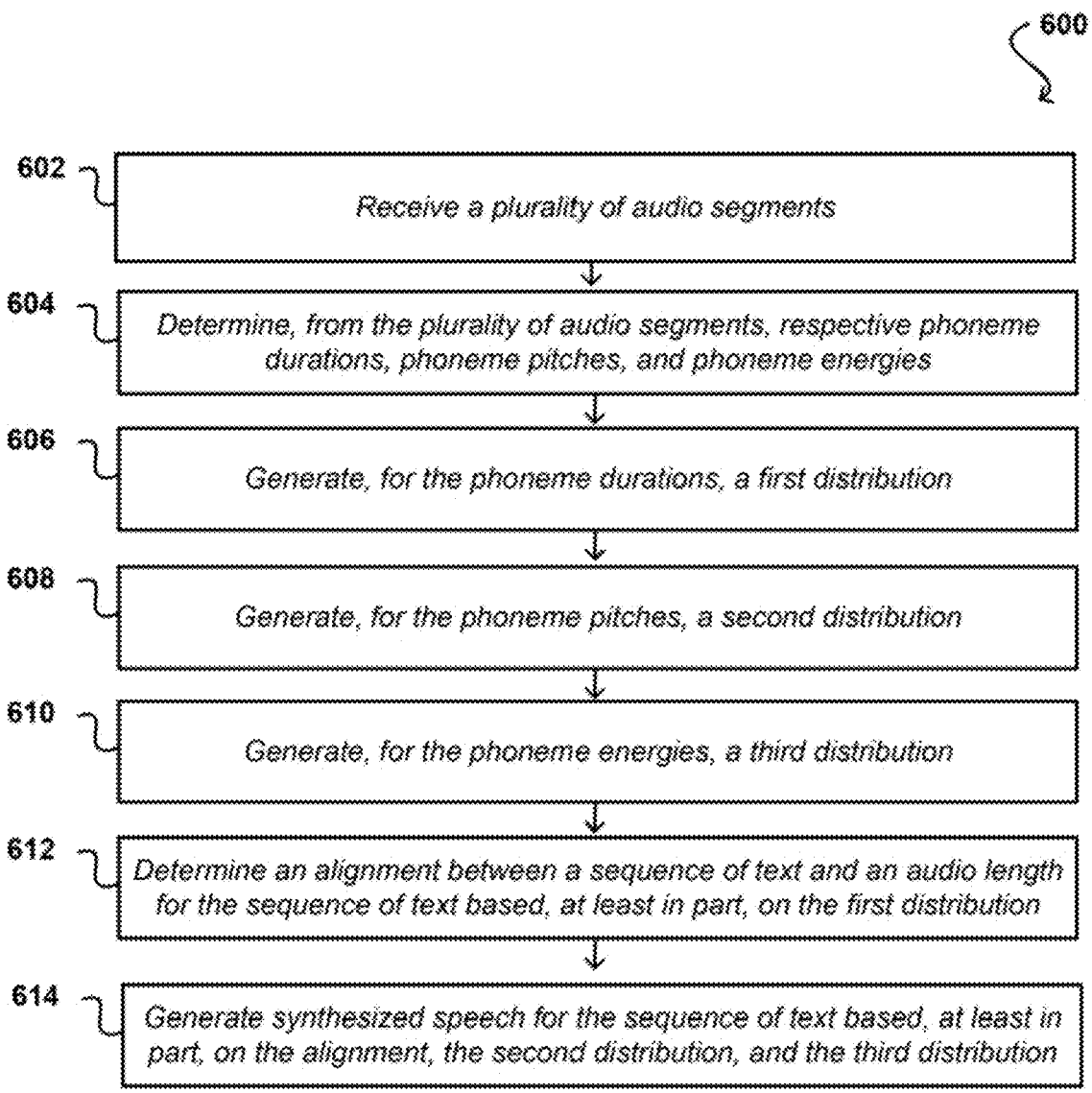
FIG. 6A illustrates an example flow chart of a process for generating synthetic speech, according to at least one embodiment.

FIG. 6A illustrates an example process 600 for generating synthesized speech. It should be understood that for this and other processes presented herein that there can be additional, fewer, or alternative steps performed in similar or alternative order, or at least partially in parallel, within the scope of various embodiments unless otherwise specifically stated. In this example, a plurality of audio segments are received 602. The audio segments may form at least part of a set of training data that is evaluated to determine different aspects of different parts of speech. In various embodiments, the audio segments may be subject to one or more pre-processing or processing steps to extract different portions of the audio segment, such as phonemes forming words, pitch, energy, and the like. In at least one embodiment, phoneme durations, phoneme pitches, and phoneme energies are determined from the plurality of audio segments 604. Information extracted from the plurality of phonemes may then be utilized to generate one or more distributions indicative of certain features found in the audio segments. For example, phoneme durations may be used to generate a first distribution 606, phoneme pitches may be used to generate a second distribution 608, and phoneme energies may be used to generate a third distribution 610. It should be appreciated that additional distributions to capture other parts of speech or features of the audio segments may also be generated.

In various embodiments, the distributions may be utilized to generate synthetic speech, such as associated with a conversational AI. A system may receive a text input, which is represented as a sequence of text, and determine an alignment between the sequence of text and an audio length 612. The alignment may be based, at least in part, on the first distribution, which correlates different phonemes forming the text input to their respective durations. In various embodiments, distributions are sampled for respective phonemes in order to select a phoneme duration. It should be appreciated that this type of probabilistic sampling may improve diversity in generated synthetic speech because, by sampling at inference, the same text input may be presented as different output audio, for example, due to differences in phoneme duration, among other factors. Accordingly, synthesized speech may be generated based, at least in part, on the alignment, the second distribution, and the third distribution 614. Moreover, as noted above, in various embodiments one or more additional distributions may also be utilized to generate the synthesized speech.

Figure 6B:
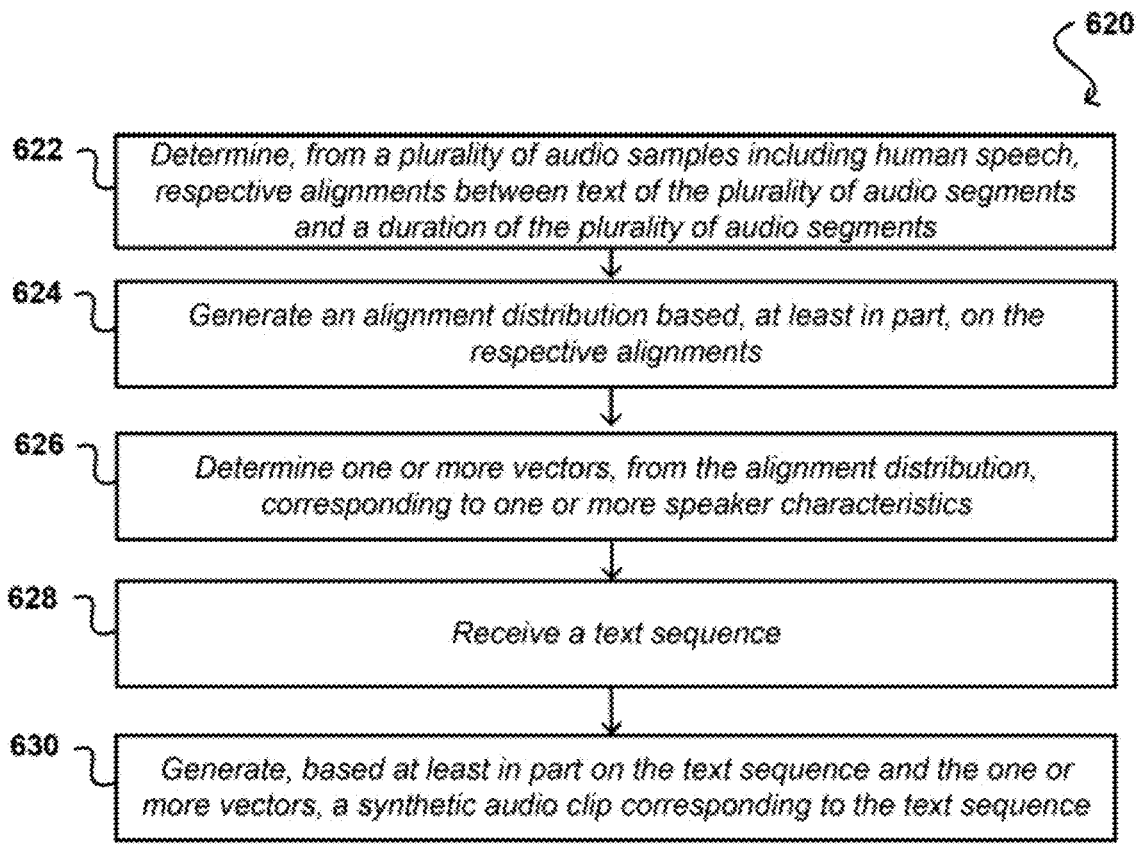
FIG. 6B illustrates an example flow chart of a process for generating synthetic speech, according to at least one embodiment.

FIG. 6B illustrates an example process 620 for generating synthesized speech. In this example, respective alignments between text of a plurality of audio segments and a duration of the plurality of audio segments is determined 622. For example, a plurality of audio segments may correspond to training information that is determined to determine a distribution of phoneme lengths for different words or phrases.

An alignment distribution may be generated, which may be based, at least in part, on the respective alignments 624. The alignment distribution may be presented in the form of a matrix that illustrates a probabilistic likelihood that a certain phoneme will align with a certain portion of a text sample. In at least one embodiment, one or more vectors, from the alignment distribution, are determined 626. The one or more vectors may correspond to one or more speaker characteristics.

As noted, various embodiments may be used to generate synthesized speech, where a text sequence is received 628. The text sequence may be input by a user or extracted from an image, among other options. A synthetic audio clip may be generated based, at least in part, on the text sequence and the one or more vectors, where the synthetic audio clip corresponds to the text sequence 630.

Figure 6C:
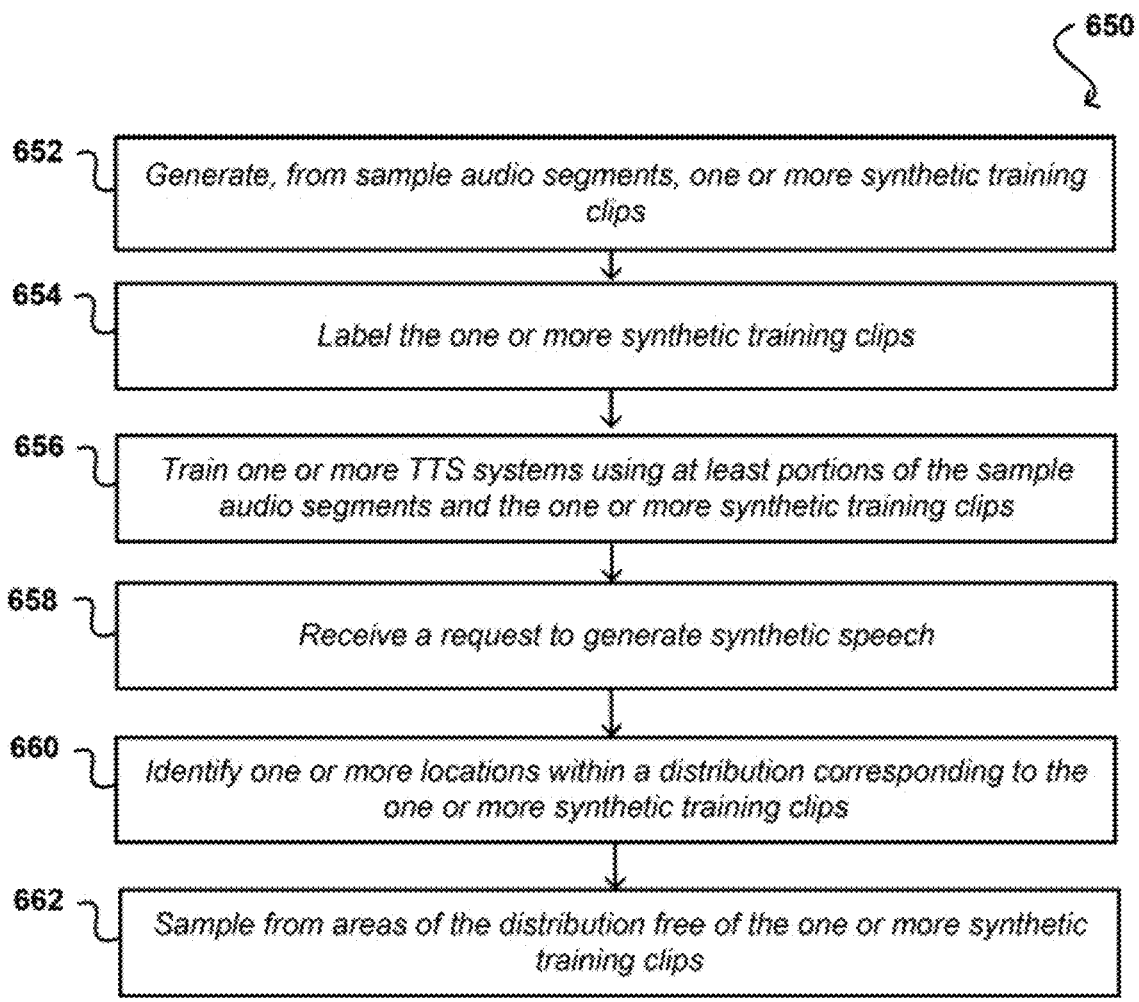
FIG. 6C illustrates an example flow chart of a process for training a text to speech system, according to at least one embodiment.

FIG. 6C illustrates an example process 650 for training a TTS system. In this example, one or more synthetic training clips are generated 652. The synthetic training clips may be generated based, at least in part, on one or more sample audio segments, which may correspond to ground truth training data provided for training the TTS system, among other options. In at least one embodiment, synthetic training clips modify one or more properties of the sample audio segments, such as changing a pitch or speed of the speech. The synthetic training clips may be labeled 654, such as by identifying their locations within a distribution or by associating metadata with the clips. One or more machine learning systems may then be trained using at least some of the sample audio segments and at least some of the one or more synthetic training clips 656. The synthetic training clips may enable a larger training set, which may improve later inferences.

In at least one embodiment, the trained machine learning system is utilized to generate synthetic audio clips. A request may be received to generate synthetic speech 658. This speech may be generated by processing a text input using the TTS system, which may align parts of speech with different durations in order to generate output audio. In at least one embodiment, one or more locations within a distribution associated with synthetic training clips are identified 660, and these locations are avoided or not sampled from during generation of the synthetic speech 662. In this manner, synthetic training clips may be used to improve modeling by increasing a data set, but may not be used during inferencing.

Data Center

Figure 7:
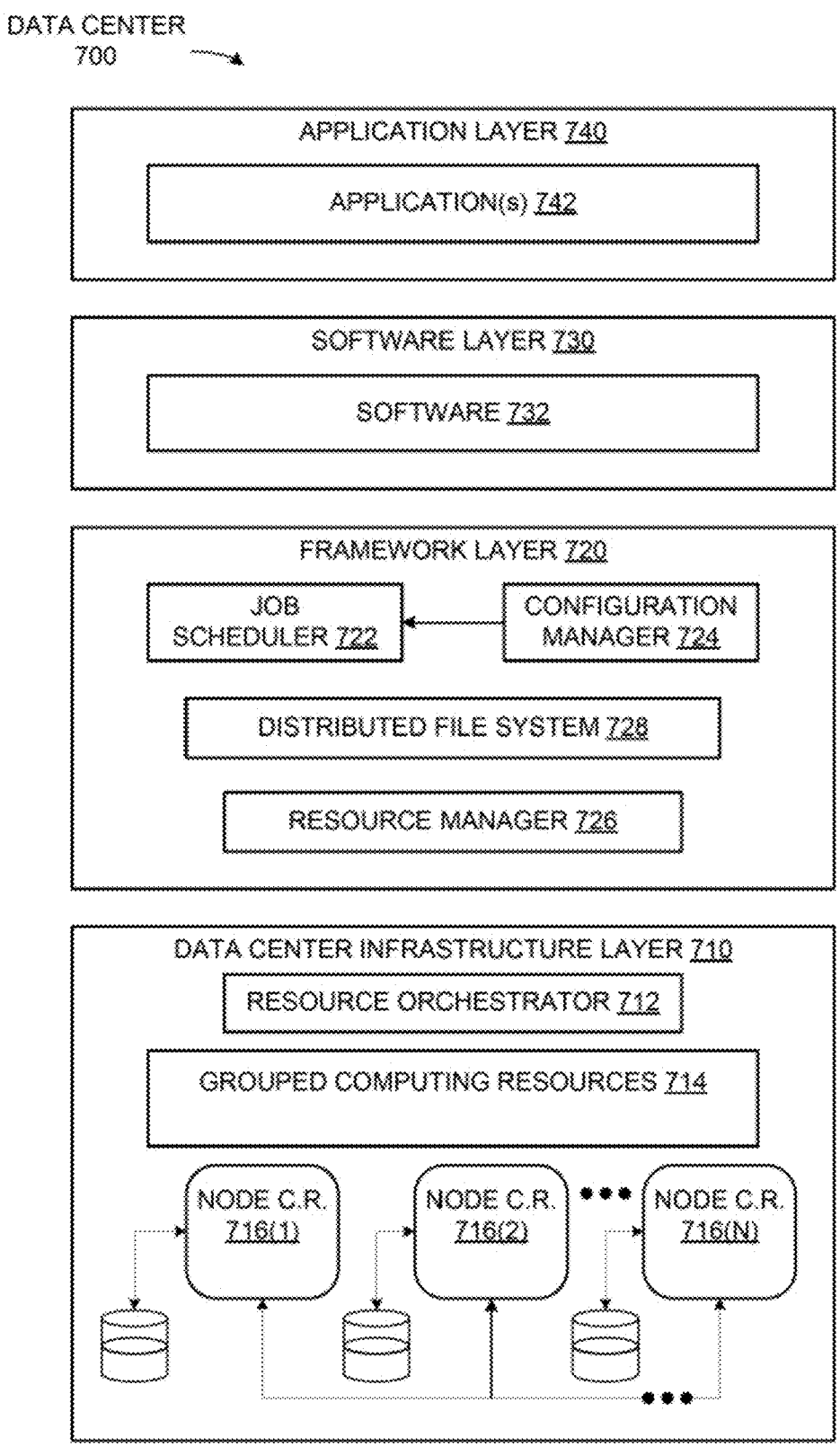
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used for generating synthetic speech.

Computer Systems

Figure 8:
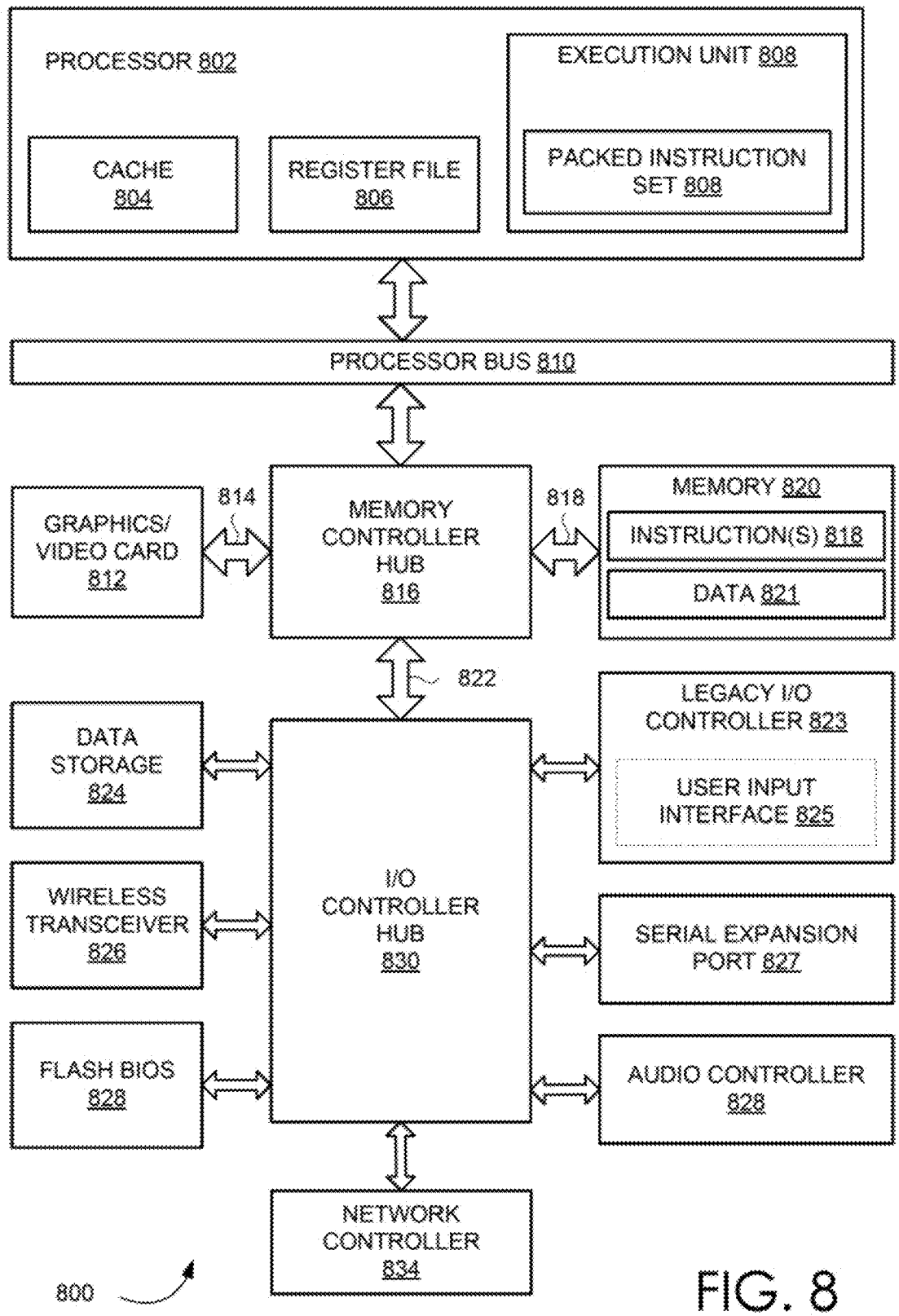
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), edge computing devices, set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used for generating synthetic speech.

Figure 9:
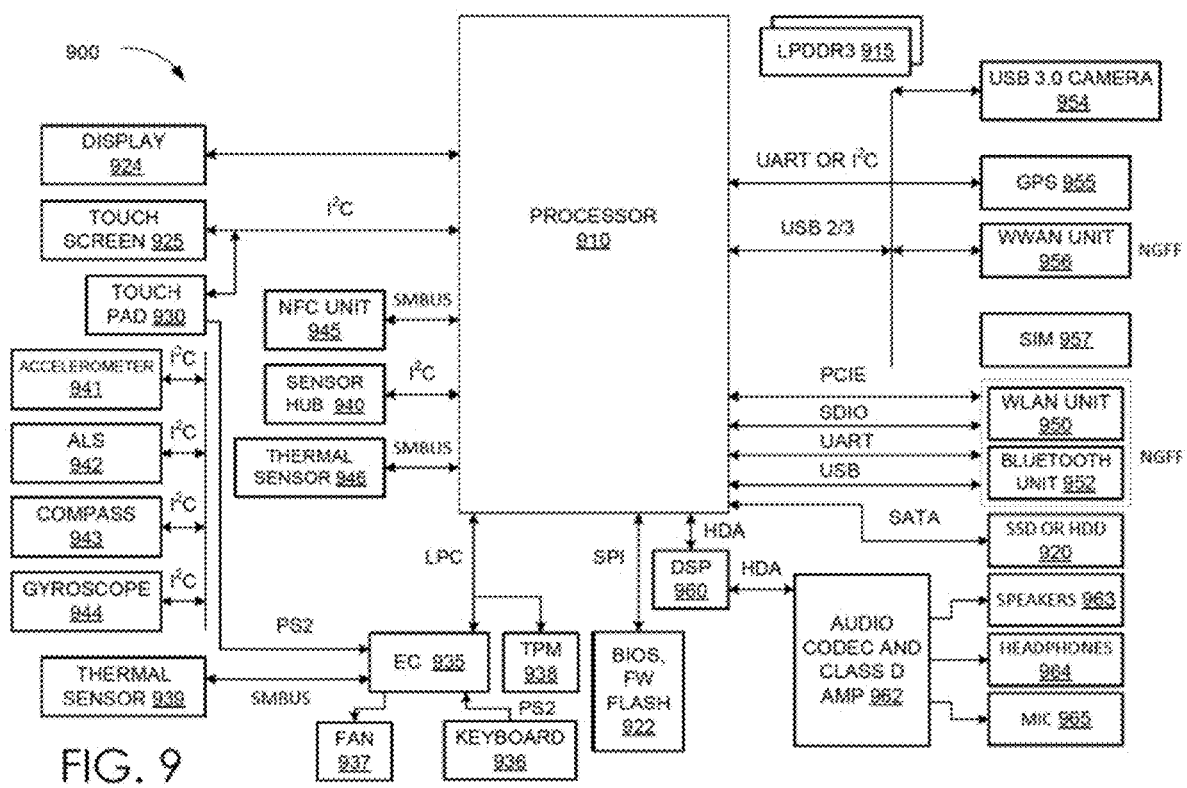
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used for generating synthetic speech.

Figure 10:
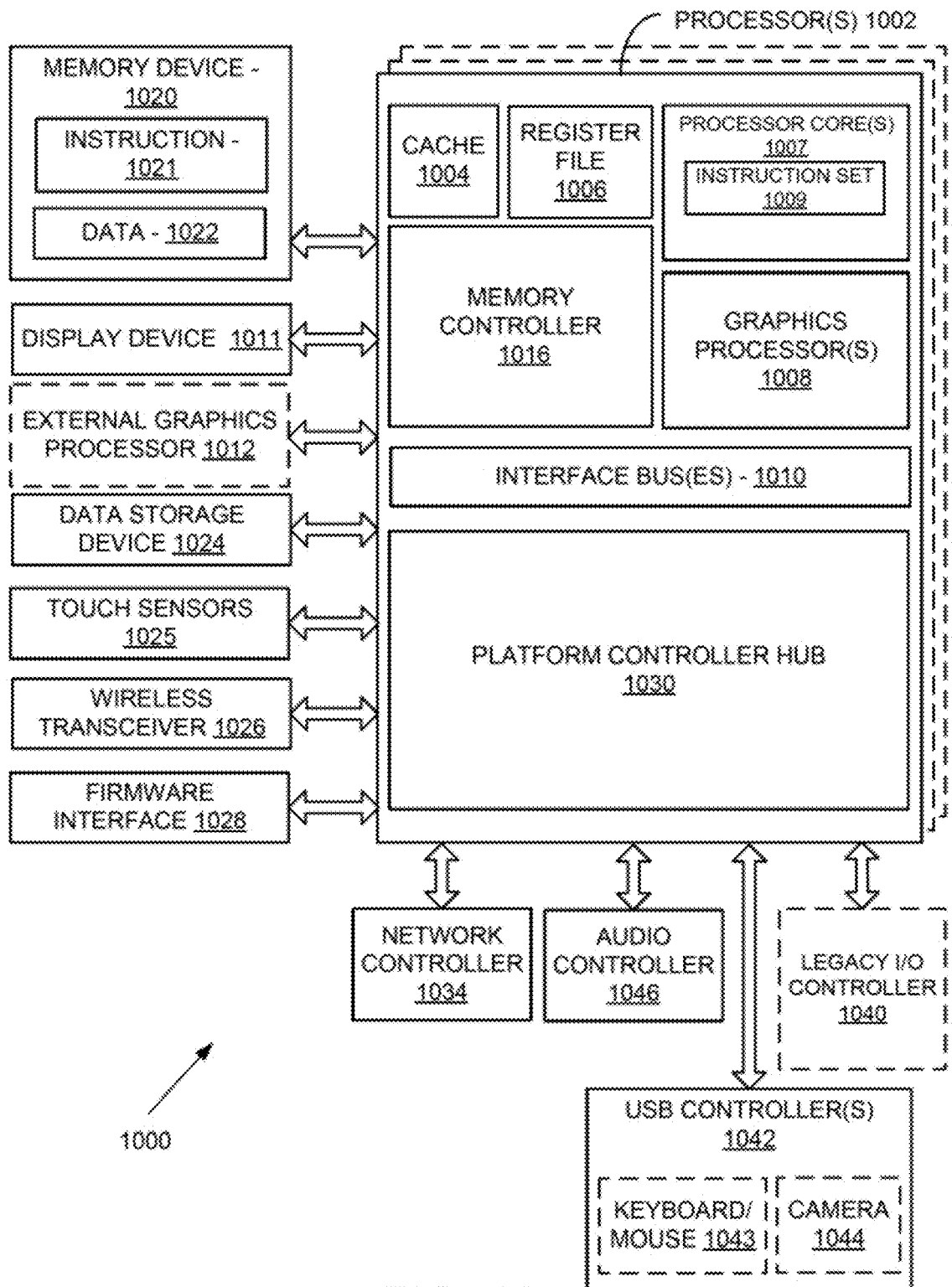
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system or datacenter having a large number of collectively or separably managed processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a cloud computing host platform, a virtualized computing platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, edge device, Internet of Things ("IoT") device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used for generating synthetic speech.

Figure 11:
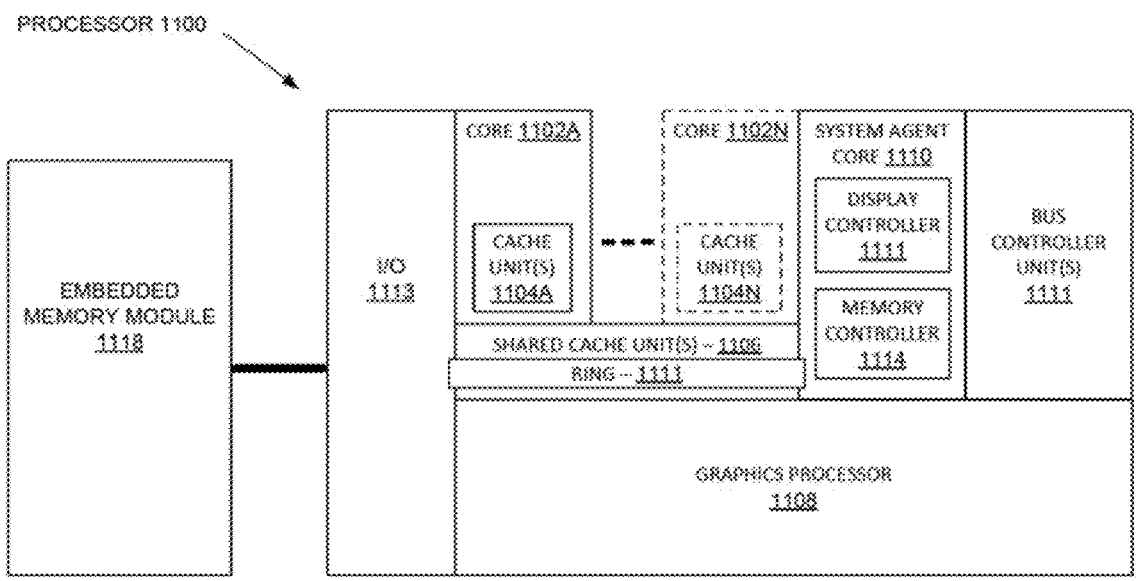
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used for generating synthetic speech.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") and/or a data processing unit ("DPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be any processor capable of general purpose processing such as a CPU, GPU, or DPU. As non-limiting examples, "processor" may be any microcontroller or dedicated processing unit such as a DSP, image signal processor ("ISP"), arithmetic logic unit ("ALU"), vision processing unit ("VPU"), tree traversal unit ("TTU"), ray tracing core, tensor tracing core, tensor processing unit ("TPU"), embedded control unit ("ECU"), and the like. As non-limiting examples, "processor" may be a hardware accelerator, such as a PVA (programmable vision accelerator), DLA (deep learning accelerator), etc. As non-limiting examples, "processor" may also include one or more virtual instances of a CPU, GPU, etc., hosted on an underlying hardware component executing one or more virtual machines. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
   determining, from a plurality of audio segments, respective phoneme durations, phoneme pitches, and phoneme energies;
   determining a first alignment between a sequence of text and a total speech duration corresponding to probable locations for the respective phoneme durations;
   determining a second alignment for an audio segment of synthesized speech based, at least in part, on a first distribution corresponding to the phoneme durations and the first alignment; and
   generating, for the sequence of text, an audio segment comprising a synthesized recitation of the sequence of text based, at least in part, on the second alignment and at least one of a second distribution corresponding to the phoneme pitches, or a third distribution corresponding to the phoneme energies.

2. The computer-implemented method of claim 1, further comprising:
   generating a fourth distribution corresponding to one or more properties associated with the synthesized recitation based, at least in part, on the fourth distribution.

3. The computer-implemented method of claim 1, further comprising:
   applying, to the second alignment, a prior distribution to exclude pairs of phonemes and durations from the plurality of audio segments that are outside of a specified range.

4. The computer-implemented method of claim 3, wherein the prior distribution is cigar-shaped.

5. The computer-implemented method of claim 3, wherein the prior distribution is constructed from a beta-binomial distribution.

6. The computer-implemented method of claim 1, further comprising:
   determining, from the sequence of text, a plurality of text tokens; and
   aligning each of the plurality of text tokens to a respective mel frame based, at least in part, on the second alignment.

7. The computer-implemented method of claim 6, wherein the second alignment is based, at least in part, on an L2 distance between the mel frame at a first time and a text phoneme in the sequence of text.

8. The computer-implemented method of claim 1, wherein the synthesized recitation is generative such that a first synthesized recitation is different from a second synthesized recitation, each of the first synthesized recitation and the second synthesized recitation based on the sequence of text.

9. A method, comprising:
   determining, from a plurality of audio samples including human speech, alignments between text of the plurality of audio samples, a duration of the plurality of audio samples, and at least one of a pitch of the audio samples or an energy of the audio samples;
   generating an alignment distribution based, at least in part, on the alignments;
   determining a soft alignment between a first text sequence from the text and mel-frames of the alignment distribution, the soft alignment normalizing probability distributions for the alignments across the duration of the plurality of audio samples; and
   determining a hard alignment between the first text sequence and the mel-frames of the alignment distribution, the hard alignment concentrating the probability distributions from the soft alignment to a symbol for the alignments across the duration of the plurality of audio samples;
   determining one or more vectors, based on the hard alignment, corresponding to one or more speaker characteristics;
   receiving a second text sequence; and
   generating, based at least in part on the second text sequence and the one or more vectors, a synthetic audio clip corresponding to the second text sequence.

10. The method of claim 9, wherein the alignment is based, at least in part, on an alignment matrix with a beta-binomial distribution.

11. The method of claim 9, wherein an encoder and a decoder for generating the synthetic audio clip operate in parallel.

12. The method of claim 9, further comprising:
   generating a second synthetic audio clip from the second text sequence, the second synthetic audio clip being different from the first synthetic audio clip.

13. The method of claim 9, further comprising:
   generating at least one of a phoneme distribution, a pitch distribution, or an energy distribution; and
   sampling from at least one of the phoneme distribution, the pitch distribution, or the energy distribution.

14. A processor, comprising:
   one or more processing units to:
      receive an audio clip of human speech represented as a mel-spectrogram;
      determine an alignment matrix for the audio clip normalized to a probability distribution;
      apply, to the alignment matrix, a prior distribution to exclude pairs of phonemes and mel-frames in the audio clip from the alignment matrix;
      determine, from the alignment matrix, an alignment for a first text sequence within the audio clip and a plurality of mel-frames representing a duration of the audio clip;

determine one or more distributions for a pitch and an energy associated with the audio clip;

receive a second text sequence; and generate a second audio clip of the second text sequence based, at least in part, on the alignment and the one or more distributions.

15. The processor of claim 14, wherein the one or more processing units are further to implement an encoder and decoder for generating the second audio clip, wherein the encoder and decoder operate in parallel.

16. The processor of claim 14, wherein the one or more processing units are further to:

fit, onto the alignment matrix, a beta-binomial distribution.

17. The processor of claim 16, wherein the beta-binomial distribution excludes pairs of phonemes and mel-frames outside of a specified range.

18. The processor of claim 14, wherein the one or more processing units are further to generate a third audio clip from the second text sequence, the second audio clip being different from the third audio clip.

\* \* \* \* \*